US006551671B1

(12) United States Patent
Nishizawa et al.

(10) Patent No.: US 6,551,671 B1
(45) Date of Patent: Apr. 22, 2003

(54) IN-MOLD LABEL

(75) Inventors: Takatoshi Nishizawa, Ibaraki (JP); Masaki Shiina, Ibaraki (JP); Yasuhiro Ueda, Kyoto (JP)

(73) Assignees: Oji-Yuka Synthetic Paper Co., Ltd., Tokyo (JP); Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 09/287,194

(22) Filed: Apr. 6, 1999

(30) Foreign Application Priority Data

Apr. 6, 1998 (JP) .......................................... 10-108452

(51) Int. Cl.$^7$ ............................ B32B 1/08; B29D 22/00

(52) U.S. Cl. .................... 428/34.1; 428/34.1; 428/35.7; 428/34.3; 428/35.9; 428/41.3; 428/42.3; 428/36.5; 428/312.2; 428/36.92

(58) Field of Search .............................. 428/34.1, 34.3, 428/35.7, 35.9, 41.3, 42.3, 220, 36.5, 372.2, 910, 36.92

(56) References Cited

U.S. PATENT DOCUMENTS 5,811,163 A * 9/1998 Ohno et al. ................ 428/35.7
6,150,013 A * 11/2000 Balaji et al. ................ 428/220

FOREIGN PATENT DOCUMENTS

| | | |
|---|---|---|
| EP | 0 613 919 | * 7/1994 |
| EP | 0613919 | * 9/1994 |
| EP | 0 810 077 | * 3/1997 |
| EP | 0810077 | * 5/1997 |

* cited by examiner

*Primary Examiner*—Harold Pyon
*Assistant Examiner*—Marc Patterson
(74) *Attorney, Agent, or Firm*—Oblon, Spivak, McClelland, Maier & Neustadt, P.C.

(57) ABSTRACT

An in-mold label comprising a thermoplastic resin film base layer comprising a thermoplastic resin as the main component (I) carrying printed matter on its front side and a heat sealable resin layer (II) formed on the back side of the base layer (I) and made of a resin composition comprising 55–90 wt % of a polyethylene, 5–40 wt % of a polyetheresteramide, 1–20 wt % of a modified low-molecular weight polyethylene, and 0–20 wt % of a polyamide resin.

28 Claims, 1 Drawing Sheet

IN-MOLD LABEL

BACKGROUND OF THE INVENTION

1. Field of the Invention

The present invention relates to a label for use in in-mold molding in which the label is initially set in a mold so that the side of the label which is in contact with the mold wall surface contains printed matter, and a parison of a molten thermoplastic resin is introduced into the mold and molded by blow molding or a molten thermoplastic resin sheet is molded in the mold by vacuum forming or air pressure forming to produce a labeled container.

2. Discussion of the Background

A conventional integral molding process for producing a labeled resin container comprises inserting a blank or a label in a mold and then molding a container by injection molding, blow molding, differential pressure molding, foam molding, etc., to decorate the container within the mold (see JP-A-58-69015 (the term "JP-A" as used herein means an "unexamined published Japanese patent application") and EP-A-254923). Such known in-mold labels include gravure printed resin films, multicolor offset printed synthetic papers (see, for example, JP-B-2-78 14 (the term "JP-B" as used herein means an "examined Japanese patent publication") and JP-A-2-843 19), and gravure printed aluminum labels comprising an aluminum foil laminated on the back side thereof with high pressure low density polyethylene and an ethylene/vinyl acetate copolymer.

However, the process for producing containers decorated with the aforementioned in-mold labels or blanks through in-mold molding has the following problem. When labels are fed to a mold using an automatic label feeder especially in a low humidity atmosphere as in winter, electrostatic charges which have built up in the stack of labels are not removed and two or more labels are erroneously fed simultaneously to the mold, if the labels have insufficient antistatic properties. As a result, containers having a label adhered thereto in an improper position, i.e., rejects, are produced and the labels are not effectively utilized.

Another problem is that in a label production process the film or synthetic paper comes to have poor suitability for feeding and discharge in printing thereon especially by offset printing and, as a result, the label production machine has to be stopped and restarted many times.

Proposed for eliminating such problems are: an in-mold label having a heat sealable resin layer made of an ethylene resin containing a low-molecular weight antistatic agent of the kneading type, e.g., sorbitan monooleate or glycerol monostearate; and an in-mold label having an antistatic film formed by coating the surface of a heat sealable ethylene resin layer with a low-molecular weight antistatic agent, e.g., a poly(oxyethylene) derivative, and then drying the coating.

However, both in-mold labels have a drawback in that the antistatic properties do not last for long. Furthermore, the former in-mold label has another problem. That is, the antistatic agent migrates to and accumulate on the surface of the heat sealable resin layer to thereby significantly impair the fusion bondability of the heat- sealable resin to containers. As a result, reject containers are produced in which the labels have not been fusion-bonded to the containers at all or the labels adhered to the containers have blisters.

SUMMARY OF THE INVENTION

An object of the present invention is to provide an in-mold label having excellent suitability for label feeding and discharge and capable of producing a labeled container in which the label applied has no blister and has been fusion-bonded to the container at a high strength.

The present invention provides an in-mold label comprising a thermoplastic resin film base layer (I) carrying printed matter on its front side and a heat sealable resin layer (II) formed on the back side of the base layer (I), said heat sealable resin layer (II) being made of a resin composition comprising:

| | |
|---|---|
| component (a): a polyethylene resin | 55–90 wt % |
| component (b): a polyetheresteramide | 5–40 wt % |
| component (c): a modified low-molecular weight polyethylene | 1–20 wt % |
| and | |
| component (d): a polyamide resin | 0–20 wt %. |

The in-mold label can have satisfactory suitability for insertion into molds (suitability for label feeding and discharge) and be tenaciously fusion-bonded to container main bodies by incorporating a polyetheresteramide (b), which retains long-lasting antistatic properties and is nontacky, into the heat sealable resin layer (II) and optionally further incorporating a polyamide resin (c) thereinto.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
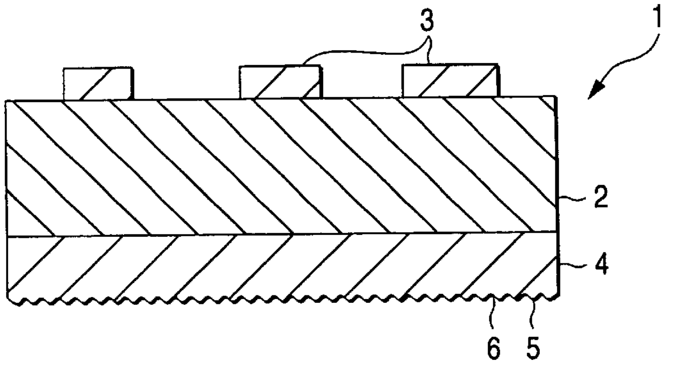
FIG. 1 is a sectional view of one embodiment of the in-mold label.

Referring now to the drawings, wherein like reference numerals designate identical or corresponding parts throughout the several views. Structure of the In-mold Label:

The in-mold label of the present invention is now described in detail.

FIG. 1 is a sectional view of an in-mold label for blow molding. In the figure, numeral 1 denotes the in-mold label, 2 a thermoplastic resin film base layer (I), 3 printed matter, and 4 a heat sealable resin layer (II). If desired and necessary, the heat sealable resin layer (II) may be embossed to avoid label blistering after application to a container (see JP-A-2-843 19 and JP-A-3-260689). Numeral 5 denotes a top of an embossed pattern and 6 denotes a valley thereof.

Figure 2:
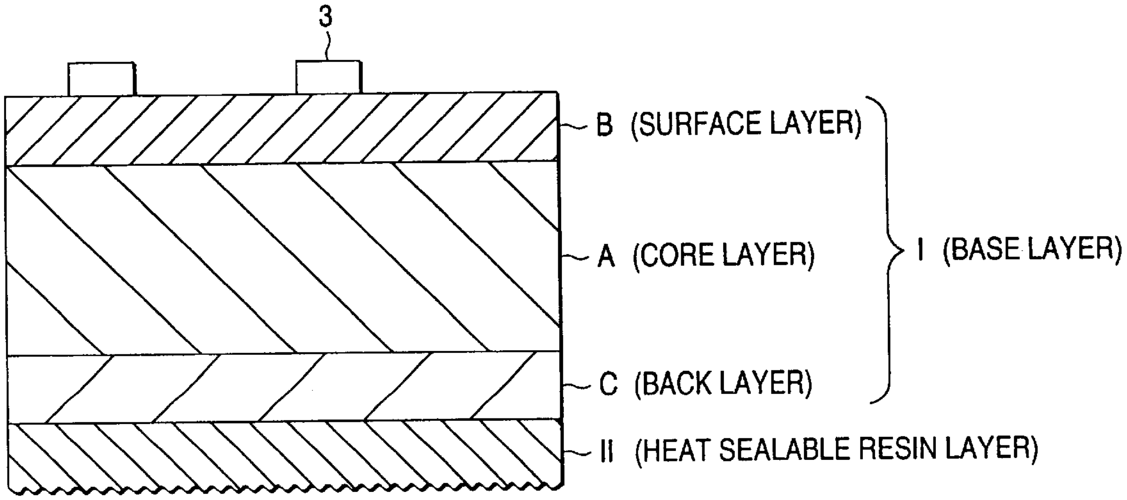
FIG. 2 is a sectional view of another embodiment of the in-mold label.

FIG. 2 is an enlarged sectional view of part of another embodiment of the in-mold label.

Base Layer(I)

Examples of the thermoplastic resin used as the material of the base layer (I) in the in-mold label include a film of a resin having a melting point offrom 135 to 264° C., e.g., polypropylene, high density polyethylene, poly(vinyl chloride), poly(ethylene terephthalate) , or a polyamide; a synthetic paper which is a microporous film obtained by stretching a polypropylene film containing from 8 to 65 wt % inorganic filler as disclosed in JP-B-46-40794a coated film obtained by coating the above described resin film or synthetic paper with a latex containing an inorganic filler (pigmented coating material); a base comprising a vapor deposited aluminum layer formed on any of the above described films; and a laminate of any of the above described films with an aluminum foil.

The number-average molecular weight of the thermoplastic resin is in the range of usually 10,000 to 500,000, preferably 15,000 to 100,000. Among thermoplastic resins, preferred are polypropylene. It is preferred that the thermoplastic resin contained in the base layer (I) has a melting point higher by at least 15° C. (particularly 20 to 180° C. than that of the component (a) contained in the heat sealable resin layer (II). Propylene resins include, for example, polypropylenes and copolymers of a larger amount (at least 75 w %) of propylene with a minor amount (25 wt % or less) of one or more comonomers, such as ethylene. Among these, preferred are polypropylenes. Suitable inorganic fillers include, for example, calcium carbonate, calcined clay, diatomaceous earth, talc, titanium oxide, barium sulfate, silica. Among these, preferred are calcium carbonate.

Preferred of such examples of the base layer (I) from the standpoints of printability, suitability for label feeding into molds, and prevention of thermal shrinkage is a microporous laminate resin film comprising a core layer (A) which is a biaxially stretched film of a resin composition comprising from 5 to 30 wt % fine inorganic particles, from 3 to 20 wt % high density polyethylene, and from 92 to 50 wt % propylene resin, a front layer (B) which is laminated to one side of the core layer (A) and is a uniaxially stretched film of a resin composition comprising from 35 to 65 wt % fine inorganic particles, from 0 to 10 wt % high density polyethylene, and from 55 to 35 wt % propylene resin; and a back layer (C) which is laminated to the core layer (A) on the side opposite to the front layer (B) and is a uniaxially stretched film of a resin composition comprising from 35 to 65 wt % fine inorganic particles, from 0 to 10 wt % high density polyethylene, and from 55 to 35 wt % propylene resin (see FIG. 2).

Also preferred for use as the base: layer (I) is a base layer film comprising the core layer (A) and front layer (B) described above and disposed therebetween a layer for regulating the density of the base layer (I).

Specifically, the above base layer film is, for example, a microporous laminate resin film comprising a core layer (A) which is a biaxially stretched film of a resin composition comprising from 5 to 30 wt % fine inorganic particles, from 3 to 20 wt % high density polyethylene, and from 92 to 50 wt % propylene resin; a back layer (C) which is laminated to one side of the core layer (A) and is a uniaxially stretched film of a resin composition comprising from 35 to 65 wt % fine inorganic particles, from 0 to 10 wt % high density polyethylene, and from 55 to 35 wt % propylene resin; an interlayer (D) which is laminated to the core layer (A) on the side opposite to the back layer (C) and is a uniaxially stretched film of a resin composition comprising from 35 to 65 wt % fine inorganic particles, from 0 to 10 wt % high density polyethylene, and from 55 to 35 wt % propylene resin, and a front layer (B) which is laminated to the interlayer (D) and is a uniaxially stretched film of a resin composition comprising from 35 to 65 wt % fine inorganic particles, from 0 to 10 wt % high density polyethylene, and from 55 to 35 wt % propylene resin and differing from the interlayer (D) in the content of the fine inorganic particles.

For example, the content of fine inorganic particles in the layer (D) is higher or lower by at least 5 wt % (preferably 10 to 20 wt %) than that in the layer (B). Examples of suitable fine inorganic particles, contained in the layers (A), (B), (C) and (D), include calcium carbonate, calcined clay, diatomaceous earth, talc, titanium oxide, barium sulfate, silica. Among these, preferred are calcium carbonate. Average particle size is in the range of usually 0.1 to 30 pm, preferably 0.2 to 20 μm.

These microporous stretched laminate resin films have a density of from 0.65 to 1.02 g/cm$^3$. In these microporous stretched laminate resin films (I), printed matter is formed on the front layer (B) side and a heat sealable resin layer (II) is formed on the back layer (C) side.

The thickness of the base layer (I) is from 20 to 200 μm, preferably from 40 to 150 μm.

The thicknesses of the layers (A), (B), (C) and (D) are, respectively, usually 12 to 80 μm (preferably 20 to 70 μm), 2 to 40 μm (preferably 3 to 35 μm), 2 to 40 μm (preferably 3 to 35 μm) and 0 to 40 μm (preferably 0 to 35 μm), Heat Sealable Resin Layer (II)

(I) Components

The resin components constituting the heat sealable resin layer (II) in the in-mold label of the present invention comprise the following components (a) to (c) and optionally include component (d).

(a) Polyethylene Resin

The term "polyethylene resin" herein is intended to include resins of homopolymers of ethylene as well as resins of copolymers of ethylene and other ethylenically unsaturated monomers. Examples of the polyethylene resin as component (a) include those having a melting-point of from 80 to 130° C., such as a low to medium density high pressure polyethylene having a density of from 0.900 to 0.935 g/cm$^3$, a linear polyethylene having a density of from 0.880 to 0.940 g/cm$^3$, ethylene/vinyl acetate copolymers, ethylene/acrylic acid copolymers, ethylene/alkyl acrylate copolymers, ethylene/alkyl methacrylate copolymers (the alkyl groups have 1 to 8 carbon atoms), and metal (Zn, Al, Li, K, Na, etc.) salts of ethylene/methacrylic acid copolymers.

Preferred are high pressure polyethylenes and linear polyethylenes each having a degree of crystallinity (as determined by the X-ray method) of from 10 to 60% and a number-average molecular weight of from 10,000 to 40,000. Optimal among these from the standpoint of adhesion to containers is a linear polyethylene obtained by copolymerizing from 40 to 98 wt % ethylene and from 60 to 2 wt % a-olefin having 3 to 30 carbon atoms using a metallocene catalyst, in particular a metallocene/aluminoxane catalyst, or using a catalyst comprising a combination of a metallocene compound, such as that disclosed in, e.g., International Publication WO 92/01723, and a compound which reacts with the metallocene compound to form a stable anion.

These polyethylene resins may be used alone or as a mixture of two or more thereof The content of component (a) in the hear sealable resin layer (II) in the present invention is generally from 55 to 90 wt %, preferably from 60 to 85 wt %. If the content of component (a) is lower than 55 wt %, the strength of fusion bonding of the label to a container during in-mold molding is low and blistering tends to occur. If the content thereof exceeds 90 wt %, the heat sealable resin layer (II) has reduced antistatic properties and this may arouse problems in inserting the in-mold label into a mold.

(b) Polyetheresteramide

Examples of the polyetheresteramide having antistatic properties as component (b) include the polyetheresteramides described in, e.g., JP-A-58-118838 and JP-A-6-317079. Preferred of these is a polyetheresteramide containing aromatic rings which is obtained by reacting component b1; a polyamide having a number-average molecular weight of from 200 to 5,000 and containing a carboxyl group at each end with component b2: an alkylene oxide adduct of bisphenol having a number-average molecular weight of from 300 to 5,000.

The polyamide having a carboxyl group at each end (component bl), used for synthesizing the polyetherestera-mide containing aromatic rings as component (b) (permanent antistatic agent), is any of (1) a polymer formed by the ring-opening polymerization of a lactam having 6 to 12 or more carbon atoms, (2) a polycondensate of an aminocarboxylic acid having 6 to 12 or more carbon atoms, and (3) a polycondensate of a dicarboxylic acid having 4 to 20 carbon atoms with a diamine having 6 to 12 or more carbon atoms. These polymers (I) to (3) each are obtained by subjecting one or more amide-forming monomers to ring-opening polymerization or polycondensation in a conventional manner in the presence of a dicarboxylic acid component having 4 to 20 carbon atoms as a modifier of molecular weight.

Examples of the lactam which forms the polymer (1) through ring-opening polymerization include caprolactam, enantholactam, laurolactam, and undecanolactam.

Examples of the aminocarboxylic acid which forms the aminocarboxylic acid polycondensate (2) described above include ω-aminocaproic acid, ω-aminoenanthic acid, ω-aminocaprylic acid, ω-aminopelargonic acid, ω-aminocapric acid, 11-aminoundecanoic acid, and 12-aminododecanoic acid.

Examples of the dicarboxylic acid which reacts with a diamine to form the polycondensate (3) include adipic acid, azelaic acid, sebacic acid, undecanedioic acid, dodecanedioic acid, and isophthalic acid. Examples of the diamine include hexamethylenediamine, heptamethylenediamine, octamethylenediamine, and decamethylenediamine.

A combination of two or more of the amide-forming monomers enumerated above may be used. Preferred of those are caprolactam, laurolactam, 12-aminododecanoic acid, and a combination of adipic acid and hexamethylenediamine. Especially preferred are caprolactam and 12-aminododecanoic acid.

Examples of the dicarboxylic acid having 4 to 20 carbon atoms include aliphatic dicarboxylic acids such as succinic acid, glutaric acid, adipic acid, pimelic acid, suberic acid, azelaic acid, sebacic acid, undecanedioic acid, and dodecanedioic acid, aromatic dicarboxylic acids such as terephthalic acid, isophthalic acid, phthalic acid, and naphthalenedicarboxylic acid, alicyclic dicarboxylic acids such as 1,4-cyclohexanedicarboxylic acid and dicyclohexyl-4,4-dicarboxylic acid; and alkali metal salts of 3-sulfoisophthalic acid, such as sodium 3-sulfoisophthalate and potassium 3-sulfoisophthalate. Preferred of these are the aliphatic dicarboxylic acids, the aromatic dicarboxylic acids, and the alkali metal salts of 3-sulfoisophthalic acid. Especially preferred are adipic acid, sebacic acid, terephthalic acid, isophthalic acid, and sodium 3-sulfoisophthalate.

The number-average molecular weight of the polyamide having a carboxyl group at each end (component b1) described above is from 200 to 5,000, preferably from 500 to 3,000. If the number-average molecular weight of the polyamide (component b1) is lower than the lower limit, the resulting polyetheresteramide itself has reduced heat resistance. If the number-average molecular weight thereof exceeds the upper limit, much time is required for polyetheresteramide production because such polyamide has reduced reactivity.

Examples of the bisphenol as a starting material for the alkylene oxide adduct of bisphenol (component b2) used as the other ingredient for forming the polyetheresteramide containing aromatic rings as component (b) include bisphenol A (4,4'-dihydroxydiphenyl-2,2-propane), bisphenol F (4,4'-dihydroxydiphenylmethane), bisphenol S (4,4'-dihydroxy-diphenyl sulfone), and 4,4'-dihydroxydiphenyl-2,2-butane. Especially preferred of these is bisphenol A.

Examples of the alkylene oxide as the other starting material for the alkylene oxide adduct as component b2 include ethylene oxide, propylene oxide, 1,2- or 1,4-butylene oxide, and mixtures of two or more thereof. Two or more alkylene oxides may be added randomwise and/or blockwise. Among these, preferred are ethylene oxide and combination thereof with not more than 50 wt % (particularly 20 wt %) of one or more other alkylene oxides (particularly propylene oxide). Especially preferred of these is ethylene oxide.

The number-average molecular weight of the alkylene, oxide adduct of bisphenol as component b2 described above is generally from 300 to 5,000, preferably from 1,000 to 3,000.

If the number-average molecular weight of component b2 is lower than the lower limit, antistatic properties are insufficient. If the number-average molecular weight thereof exceeds the upper limit, much time is required for polyetheresteramide production because such component b2 has reduced reactivity.

The content of the alkylene oxide adduct as component b2 in the polyetheresteramide containing aromatic rings (component b) is generally from 20 to 80 wt %, preferably from 25 to 75 wt %, based on the total amount of components b1 and b2.

Contents of component b2 lower than the lower limit are undesirable in that component (b) has poor antistatic properties. Contents thereof exceeding the upper limit are undesirable in that component (b) itself has reduced heat resistance.

Examples of processes for producing the polyetheresteramide containing aromatic rings (component b) include the following processes (1) and (2).

Process (1): An amide-forming monomer is reacted with a dicarboxylic acid having 4 to 20 carbon atoms to form a polyamide having a carboxyl group at each end as component b1. An alkylene oxide adduct of bisphenol as component b2 is added to the polyamide, and these ingredients are polymerized at a high temperature and a reduced pressure to produce component (b).

Process (2): An amide-forming monomer is introduced into a reaction vessel simultaneously with a dicarboxylic acid having 4 to 20 carbon atoms and an alkylene oxide adduct of bisphenol as component b2. The reactants are reacted in the presence or absence of water at a high temperature with pressurizing to thereby yield a polyamide having a carboxyl group at each end, component b1, as an intermediate. Thereafter, the polyamide having a carboxyl group at each end as component b1 is polymerized with the alkylene oxide adduct of bisphenol as component b2 under a reduced pressure to produce component (b).

In the above polymerization reactions, known esterification catalysts are generally used. Examples of the catalysts include antimony catalysts such as antimony trioxide, tin catalysts such as monobutyl tin oxide, titanium catalysts such as tetrabutyl titanate, and metal acetate catalysts such as zinc acetate. The amount of these esterification catalysts employed is generally from 0.1 to 5% by weight based on the total amount of components b1 and b2.

The polyetheresteramide containing aromatic rings (component b) has a reduced viscosity (0.5 wt % m-cresol solution, 25° C.) of generally from 0.5 to 4.0, preferably from 0.6 to 3.0. If the reduced viscosity thereof is lower than the lower limit, heat resistance is poor. If the reduced viscosity thereof exceeds the upper limit, moldability tends to be reduced.

The content of the polyetheresteramide containing aromatic rings (component b) in the components of the heat sealable resin layer (II) is generally from 5 to 40 wt %, preferably from 5 to 30 wt %. If the content of component b is lower than the lower limit, the heat sealable resin layer (II) has insufficient antistatic properties. If the content thereof exceeds the upper limit, the strength of fusion bonding of the label to a container is low.

(c) Modified Low-molecular Weight Polyethylene

The modified low-molecular weight polyethylene used as component (c) functions to compatibilize the polyethylene resin as component (a) with the polyetheresteramide containing aromatic rings as component (b) (permanent antistatic agent) and the polyamide resin as component (d), described below. Examples of the modified low-molecular weight polyethylene include those having a number-average molecular weight of usually from 800 to 30,000, preferably 1,000 to 20,000, and containing in the molecule at least one group selected from hydroxyl, carboxy (anhydride), oxyalkylene, epoxy, and amino groups. This modified low-molecular weight polyethylene (component c) is preferably at least one member selected from the following components c1 and c2.

Component c1: a modified low-molecular weight polyethylene having a number-average molecular weight of gene rally from 800 to 25,000, preferably from 1,000 to 20,000, and an acid value of generally from 5 to 150, preferably from 10 to 100.

Component c2: a modified low-molecular weight polyethylene having a number-average molecular weight of generally from 850 to 28,000, preferably from 1,000 to 20,000, which is obtained by secondarily modifying part or all of the carboxylic acid or anhydride units in component c1 with an alkanolamine and/or a polyoxyalkylene compound containing at least one hydroxyl or amino group.

Component c1

The modified low-molecular weight polyethylene as component c1 can be obtained from a low-molecular weight polyethylene having a number-average molecular weight of from 700 to 20,000 obtained by the polymerization of ethylene or the thermal degradation of a high-molecular weight polyethylene, by reacting the same with an α,β-unsaturated carboxylic acid and/or its anhydride by the solution method or melt method if necessary in the presence of an organic peroxide to thereby modify the low-molecular weight polyethylene. From the standpoint of easiness of modification, it is preferred to use a low-molecular weight polyethylene obtained by thermal degradation, which can be produced, for example, by the thermal degradation method described in JP-A-3-62804.

Examples of the α,β-unsaturated carboxylic acid and/or its anhydride for use in the modification include (meth) acrylic acid, maleic acid (anhydride), fumaric acid, itaconic acid (anhydride), and citraconic anhydride. Especially preferred of these is maleic anhydride.

The amount of the α,β-unsaturated carboxylic acid and/or its anhydride used for the modification is generally from 1 to 25 wt %, preferably from 3 to 20 wt %, based on the amount of the low-molecular weight polyethylene.

If the number-average molecular weight of the thus-obtained component c1 is lower than the lower limit specified above, the label shows poor suitability for feeding and discharge. If the number-average molecular weight thereof exceeds the upper limit, component c1 shows a poor compatibilizing effect and the strength of fusion bonding of the label to a container is reduced.

If the acid value of component c1 is lower than the lower limit specified above, it shows a poor compatibilizing effect. If the acid value thereof exceeds the upper limit, component c1 has an impaired hue and this is causative of coloring. of the heat sealable resin layer (II).

Component c2

Component c2 can be obtained by secondarily modifying part or all of the carboxylic acid or anhydride units in component c1 with, e.g., an alkanol amine and/or a polyoxyalkylene compound containing at least one hydroxyl or amino group (imidization or esterification). Examples of the alkanolamine include monoethanolamine, monoisopropanolamine, diethanolamine, and diisopropanolamine. Especially preferred of these is monoethanolamine.

Examples of the polyoxyalkylene compound containing at least one hydroxyl or amino group include compounds containing from 2 to 4 carbon atoms in each alkylene group and having a hydroxyl group at each end, such as polyethylene glycol and polypropylene glycol, and compounds of the structure formed by replacing the hydroxyl groups of these dihydroxy compounds with amino or epoxy groups, for instance, by cyanoethylation of the hydroxyl group followed by hydrogenation into amino group, or by addition of a epihalohydrin (such as epichlorhydrin) to the hydroxyl group to introduce glycidyl group. Examples thereof further include polyoxyalkylene compounds basically having a hydroxyl group at one end and obtained by causing a compound having an active hydrogen, such as an alcohol containing from 1 to 20 or more carbon atoms (e.g., methanol, ethanol, butanol, octanol, lauryl alcohol, or 2-ethylhexyl alcohol) or a phenol (e.g., phenol, an alkylphenol containing from I to 20 or more carbon atoms in the alkyl group, naphthol, phenylphenol, or benzylphenol), to add an alkylene oxide.

These polyoxyalkylene compounds have a molecular weight of generally from 300 to 5,000. Although the degree of the secondary modification is not particularly limited, from 10 to 100 mol % of the carboxylic acid (anhydride) units in component c1 have preferably been imidized or esterified.

If the number-average molecular weight of component c2 is lower than the lower limit specified above, the label shows poor suitability for feeding and discharge. If the number average molecular weight thereof exceeds the upper limit, component c2 shows a poor compatibilizing effect.

Two or more of the modified low-molecular weight polyethylenes shown above as examples of components c1 and c2 may be used in combination. It is also possible to use a modified low-molecular weight polyethylene having all of carboxyl, hydroxyl, and polyoxyalkylene groups in the molecule.

The content of component (c) in the components of the heat sealable resin layer (II) in the present invention is generally from 1 to 20 wt %, preferably from 3 to 15 wt %.

If the content of component (c) is lower than the lower limit, the compatibilizing effect thereof is lessened and phase separation between resins is apt to occur. If the content thereof exceeds the upper limit, the label shows poor suitability for feeding and discharge.

(d) Polyamide Resin

Examples of the polyamide resin used as component (d) include (1) polymers obtained by the ring-opening polymerization of lactams having 6 to 12 or more carbon atoms, (2)

polycondensates of aminocarboxylic acids having 6 to 12 or more carbon atoms, and (3) polycondensates of dicarboxylic acids having 4 to 20 carbon atoms with diamines having 6 to 12 or more carbon atoms.

Specific examples thereof include nylon 66, nylon 69, nylon 610, nylon 612, nylon 6, nylon 11, nylon 12, and nylon 46. Also usable are copolyamides such as nylon 6/66, nylon 6/10, nylon 6/12, and nylon 6/66/12. Examples of component (d) further include aromatic-containing polyamides obtained from an aromatic dicarboxylic acid, e.g., terephthalic acid or isophthalic acid, and either m-xylenediamine or an aliphatic diamine.

Especially preferred of these are nylon 66, nylon 6, and nylon 12.

The polyamide resin used as component (d) desirably has a relative viscosity (98% sulfuric acid; concentration, 1 g/100 ml, 25° C.) of Generally 5 or lower, preferably from 1.2 to The content of the polyamide resin as component (d) in the heat sealable resin layer (II) is generally from 0 to 20 wt %, preferably from 1 to 10 wt %. If the content of component (d) exceeds the upper limit, moldability into film is reduced.

(e) Optional Components

Any desired other known additives for resins may be added to the components of the heat sealable resin layer (II) in the present invention, as long as these optional components do not adversely influence the performances required of the heat sealable resin layer. Examples of such additives include dyes, nucleating agents, lubricants, plasticizers, release agents, antioxidants, flame retardants, and ultraviolet absorbers.

The heat sealable resin layer (II) has a thickness of generally from 1 to 10 μm, preferably from 2 to 8 μm.

The thickness of the heat sealable resin layer (II) should be at least 1 μm in order for the resin layer (II) to melt during blow molding by the thermal action of the parison of molten polyethylene or polypropylene to provide tenacious adhesion between the label and the molded container. Thicknesses thereof exceeding 10 μm are undesirable in that label curling occurs to cause difficulties in offset printing and in label fixing to a mold.

As stated hereinabove, the heat sealable resin layer of the label is preferably embossed in order to avoid blistering during blow molding, as described in JP-A-2-843 19 and JP-A-3-260689.

For example, an embossed pattern having from 5 to 25 lines per 2.54 cm is formed, with the depth of the valleys thereof being from 1 to 8 μm and being at least ⅓ of the thickness of the heat sealable resin layer. Embossing is unnecessary for labels for injection molding.

If desired and necessary, these in-mold labels may be subjected to corona discharge treatment or the like to improve the surface printability of the base layer (I).

Printed matter can be formed by gravure printing, offset printing, flexographic printing, screen printing, etc. The print may contain a bar code, maker's name, seller's name, character, trademark, usage, and the like.

A printed and embossed label (1) is cut into a desired shape and size by punching. This in-mold label may have such a size as to cover a part of the surface of a container. In general, however, the label is produced as a blank for surrounding the side wall of a container cup, or as a label to be applied to the front and/or back side of a container bottle produced by blow molding In-Mold Molding The in-mold label is set in the cavity of the female mold, i.e., the lower mold half, of a differential pressure forming mold in such a manner that the print side of the label is in contact with the cavity wall The label is then fixed to the inner surface of the mold wall by suction. A sheet of a molten resin which is to form a container is placed over the female mold to conduct differential pressure forming in an ordinary way. As a result, a labeled container is molded in which the label has been fused to and united with the external surface of the container wall.

Although the differential pressure forming may be either of vacuum forming or air pressure forming, a combination of both is generally preferably carried out with a plug assist. This label is also applicable to blow molding in which a parison of a molten resin is pressed with air pressure against the inner surface of the mold wall.

The labeled container thus produced is free from deformation of the label (1), has tenacious adhesion between the container body and the label (I), and has a satisfactory decorative appearance with no blistering, because the label (1) was fixed to the inner surface of the mold before being united with the resin container by integral molding.

EXAMPLES

The present invention will be explained below in more detail by reference to the following Examples and Comparative Examples.

I: Methods for Determining and Evaluating Properties

In the Examples and Comparative Examples, properties were determined and evaluated by the following methods.

(1) Determination of Properties (a) MNR: in accordance with JIS K7210.

(b) Density. in accordance with JIS K7112.

(c) Surface Resistivity: The surface resistivity of a label on the heat sealable resin layer (II) side was measured in an atmosphere having a temperature of 20° C. and a relative humidity of 50%.

(2) In-Mold Molding (d) Label Suitability for Insertion into Mold

A hundred labels cut into a size of 60 mm by 110 mm by punching were continuously fed into a split mold for blow molding by means of an automatic label feeder manufactured by Pentel Co., Ltd. in an atmosphere having a temperature of 20° C. and a relative humidity of 40%, and the number of label feeding problems (feeding of two or more labels at a time or label falling from the mold) which occurred during molding was counted.

○: no label feeding problem occurred.

Δ: one to five label feeding problems occurred.

x: six or more label feeding problems occurred.

(e) Strength of Fusion Bonding of Label to Container

A label applied to a container was cut into a width of 15 mm, and the strength of adhesion between the label and the container was determined through T peeling by means of tensile tester "Autograph Type AGS-D", manufactured by Shimadzu Corp., at a pulling rate of 300 mm/min.

Criteria for practical use of labels are as follows.

≧400 (g/15 mm): completely no problem in practical use.

200–400 (g/15 mm): no problem in practical use although adhesion is slightly poor.

≦200 (g/15 mm): unsuitable for practical use.

II: Experiment Examples

Production of Polyetheresteramides containing Aromatic Rings (Component b)

Production Example 1

Into a stainless-steel autoclave having a capacity of 3 liters were introduced 112 parts of ϵ-caprolactam, 105 parts of an ethylene oxide adduct of bisphenol A having a number-average molecular weight of 1,000, 15 parts of adipic acid, 0.3 parts of "Irganox 1010" (antioxidant manufactured by Ciba-Geigy Ltd.; tradename), 0.5 parts of zirconyl acetate, and 7 parts of water. After the atmosphere in the autoclave was replaced with nitrogen gas, the autoclave was closed and the contents were stirred at a temperature of 220° C. and an elevated pressure for 1.5 hours to obtain a homogeneous solution. Polymerization was then conducted at 245° C. and a reduced pressure of 1 mmHg or lower for 3.5 hours to obtain a viscous polymer.

This polymer was taken out of the autoclave, placed in the form of a strand on a belt, and then pelletized to obtain a polyetheresteramide.

The polymer obtained had a reduced viscosity ($\eta_{sp}$/C, m-cresol solvent, 25° C., C=0.5 wt %; the same applies hereinafter) of 1.80. This polyetheresteramide is referred to as B1.

Production Example 2

Into a stainless-steel autoclave having a capacity of 3 liters were introduced 110 parts of 12-aminododecanoic acid, 16.3 parts of adipic acid, 0.3 parts of "Irganox 1010", and 7 parts of water. After the atmosphere in the autoclave was replaced with nitrogen gas, the autoclave was closed and the contents were stirred at a temperature of 220° C. and an elevated pressure for 4 hours. Thus, 117 parts of a polyamide oligomer having a carboxyl group at each end and having an acid value of 107 was obtained.

To the oligomer were added 225 parts of an ethylene oxide adduct of bisphenol A having a number-average molecular weight of 2,000 and 0.5 parts of zirconyl acetate. Polymerization was then conducted at 245° C. and a reduced pressure of I mmHg or lower for 5 hours to obtain a viscous polymer.

This reaction product was treated in the same manner as in Production Example 1 to obtain a polyetheresteramide.

The polymer obtained had a reduced viscosity of 2.10. This polyetheresteramide is referred to as B2.

Production of Modified Low-molecular Weight Polyolefins (Component c)

Production Example 3

A mixture of 95 parts of a low-molecular weight polyethylene obtained through thermal degradation and having a number-average molecular weight of 3,000 and a density of 0.92 g/cm$^3$, 5 parts of maleic anhydride, and 60 parts of xylene was melted at 140° C. in a nitrogen stream. To the melt was dropwise added a 50% xylene solution of 1.5 parts of t-butyl peroxide over a period of 15 minutes. The reactants were then reacted for 1 hour. After completion of the reaction, the solvent was distilled off to obtain an acid-modified low-molecular weight polyethylene.

This modified polymer had an acid value of 25.7 and a number-average molecular weight of 5,000. This modification product is referred to as C1.

Production Example 4

In 100 parts of xylene was dissolved 95 parts of the acid-modified low-molecular weight polyethylene obtained in Production Example 3 at 120° C. in a nitrogen stream. To the solution was dropwise added 5 parts of monoethanolamine over a period of 15 minutes. The reactants were then reacted for 1 hour. After completion of the reaction, the solvent and the monoethanolamine remaining unreacted were distilled off to obtain a modified low-molecular weight polyethylene having hydroxyl groups.

This modified polymer had a hydroxyl value of 25.2 and a number-average molecular weight of 6,000. This modification product is referred to as C2.

Production Example 5

A mixture of 95 parts of the acid-modified low-molecular weight polyethylene obtained in Production Example 3 and 50 parts of an adduct of 24 moles of ethylene oxide to lauryl alcohol was melted at 180° C. in a nitrogen stream. Esterification reaction was then conducted at a reduced pressure of 10 mmHg or lower for 5 hours to obtain a polyoxyalkylene-modified low-molecular weight polyethylene.

This polyoxyalkylene-modified polymer had a hydroxyl value of 0.5 and a number-average molecular weight of 7,000. It was ascertained from results of NMR spectrometry that the esterification reaction had been carried out quantitatively. This modification product is referred to as C3.

Label Production Examples

Example 1

(1) A resin composition (A) consisting of 67 parts by weight of polypropylene "Novatec PP, MA-8" (tradename; melting point, 164° C.), manufactured by Japn Polychem Corp., 10 parts by weight of high density polyethylene "Novatec HD, HJ580" (tradename, melting point, 134° C. density, 0.960 g/cm$^3$), manufactured by Japan Polychem Corp., and 23 parts by weight of calcium carbonate particles having a particle diameter of 1.5 $\mu$m was melt kneaded with an extruder. The melt was extruded at 250° C. through a die into a sheet form, and the sheet was cooled to about 50° C.

Subsequently, this sheet was heated to about 153° C. and stretched 4 times in the machine direction by means of rolls having different peripheral speeds. A uniaxially stretched film was thus obtained.

(2) A resin composition (B) consisting of 51.5 parts by weight of polypropylene "Novatec PP, MA-3" (tradename; melting point, 165° C.), manufactured by Japan Polychem Corp., 3.5 parts by weight of high density polyethylene "HJ580" having a density of 0.950 g/cm$^3$, 42 parts by weight of calcium carbonate particles having a particle diameter of 1.5 $\mu$m, and 3 parts by weight of titanium oxide particles having a particle diameter of 0.8 $\mu$m was separately melt kneaded at 240° C. with another extruder. This melt was extruded through a die into a film form and laminated to the front side of the film stretched in the machine direction to thereby obtain a laminate (B/A) consisting of a front layer and a core layer.

(3) Seventy parts by weight of a mixture of 53 parts by weight of an ethylene/1-hexene copolymer obtained by copolymerizing ethylene and 1-hexene using a metallocene catalyst and having an MFR of 18 g/10 min and a density of 0.898 g/cm$^3$ (1-hexene content, 22 wt %; degree of crystallinity, 30; number-average molecular weight, 23,000) and 17 parts by weight of high pressure low density polyethylene having an MFR of 4 g/10 min and a density of 0.92 g/cm$^3$ was mixed with 18 parts by weight of the polyetheresteramide B1 obtained in Production Example 1 given above, 6 parts by weight of a polyamide resin (UBE Nylon 6), and 6 parts by weight of the acid-modified low-molecular weight polyethylene C1 obtained in Production Example 3, by means of a tumbling mixer for 3 minutes. The resulting mixture was kneaded with a vented twin screw extruder set at 230° C. and then extruded through a die into strands, which were cut to obtain pellets for heat sealable resin layer formation (II).

(4) A composition (C) consisting of 51.5 parts by weight of polypropylene "MA-3", 3.5 parts by weight of high density polyethylene "HJ580", 42 parts by weight of calcium carbonate particles having a particle diameter of 1.5 μm, and 3 parts by weight of titanium oxide particles having a particle diameter of 0.8 μm and the pellets for heat sealable resin layer formation (II) were melt kneaded at 230° C. with separate extruders. These melts were fed to a co-extrusion die and laminated to each other within the die, and the resulting laminate film was extruded and laminated to the layer A side of the laminate (B/A) consisting of a front layer and a core layer so that the heat sealable resin layer (II) faced outward.

This four-layer film (B/A/C/II) was introduced into a tenter oven, where the film was heated to 155° C. and then stretched 7 times in the transverse direction with a tenter. Subsequently, the stretched film was heated at 164° C. for thermal setting, and the front layer (layer B) side was treated with 70 $W/m^2$/min corona discharge. The film thus treated was cooled to 55° C. and then trimmed. Thus, a microporous stretched resin film having a four-layer structure was obtained which had a density of 0.790 $g/cm^3$ and a thickness of 100 μm (B/A/C/II=30/40/25/5 μm).

Offset printing was conducted on the front layer (B) side of this stretched laminate resin film of the four-layer structure in an atmosphere having a temperature of 25° C. and a relative humidity of 40%. Since the in-mold label sheet thus obtained was reduced in static buildup, it could be fed and discharged smoothly during the printing and no temporary stoppage of the printing operation was necessary.

Subsequently, the printed label sheet was passed through embossing rolls to form on the heat sealable resin layer (II) side an embossed pattern comprising dotted lines at an interval of 1.27 mm (20 lines) and having a valley depth of 8 μm. This embossed heat sealable resin layer (II) had a Bekk's surface smoothness:(JIS P-8119) of 300 seconds.

The embossed sheet was cut and punched to obtain an in-mold label (1) (width, 60 mm, length, 110 mm). The surface resistivity of the heat sealable resin layer (II) of this label was measured. The surface resistivity thereof was further measured after the label was allowed to stand at ordinary temperature for 6 months. The results obtained are shown in Table 1.

The in-mold label (1) was fixed by suction to one half of a split mold for blow molding by means of an automatic label feeder so that the printed side of the label was in contact with the mold. High density polyethylene (melting point, 134° C.) was melt extruded at 200° C. to form a parison, and the split mold was then closed. Subsequently, air compressed to 4.2 $kg/cm^2$ was fed into the parison to expand the parison and closely contact the same with the mold. Thus, the parison was formed into a container shape and the in-mold label was fused thereto. After cooling, the mold was opened to obtain a labeled hollow container.

The results of this label application are given in Table 1 with respect to the suitability of the label for insertion into the mold, the occurrence or non-occurrence of blistering, and the adhesion strength of the label.

This labeled hollow container was free from print fading, and underwent neither label shrinkage nor blistering. The fusion bonding strength between the container and the label was 550 g/15-mm width. The evaluation results obtained are shown in Table 1.

Examples 2 to 5 and Comparative Examples 1, 4, and 5

In-mold labels were obtained in the same manner as in Example 1, except that the composition of the heat sealable resin layer (II) was changed to those shown in Table 1. The results of evaluations of these labels are shown in Table 1.

Comparative Example 2

An in-mold label was obtained in the same manner as in Example 1, except that the heat sealable resin layer (II) was formed from a. composition consisting of 74 parts by weight of the ethylene/1-hexene copolymer obtained in Example 1, 24 parts by weight of high pressure low density polyethylene having a density of 0.920 $g/cm^3$, and a mixture of 0.8 parts by weight of lauryl diethanolamide and 1.2 parts by weight of a sodium alkane sulfonate as a low-molecular weight migration type antistatic agent. The results of evaluations of this label are shown in Table 1.

Comparative Example 3

The heat sealable resin layer of the in-mold label obtained in Comparative Example 1 was treated with 50 $W/m^2$/min corona discharge. Thereafter, water soluble acrylic resin antistatic agent "Suftomer 3200" (manufactured by Mitsubishi Chemical Corp.) was applied to the treated surface in an amount of 0.1 $g/m^2$ (on a solid basis) and then dried. The results of evaluations of this label are shown in Table 1:

TABLE 1

| | Example | | | | | Comparative Example | | | | |
|---|---|---|---|---|---|---|---|---|---|---|
| | 1 | 2 | 3 | 4 | 5 | 1 | 2 | 3 | 4 | 5 |
| Composition of heat sealable resin layer (pts. wt.) | | | | | | | | | | |
| Ethylene/1-hexane copolymer (Tm = 100° C.) | 53 | 46 | — | 46 | 46 | 75 | 74 | 75 | 70 | 38 |
| High pressure low density polyethylene (Tm = 110° C.) | 17 | 16 | — | 16 | 16 | 25 | 24 | 25 | 23 | 12 |
| Linear low density polyethylene (Tm = 120° C.) | — | 10 | 16 | 10 | 10 | — | — | — | — | — |
| Ethylene/methyl acrylate copolymer (Tm = 90° C.) | — | — | 50 | — | — | — | — | — | — | — |
| PEEA | | | | | | | | | | |
| B1 | 18 | 17 | 20 | — | — | — | — | — | 4 | 30 |
| B2 | — | — | — | 17 | 17 | — | — | — | — | — |
| Polyamide (nylon 6) | 6 | 6 | 7 | 6 | 6 | — | — | — | 2 | 10 |

TABLE 1-continued

| | Example | | | | | Comparative Example | | | | |
|---|---|---|---|---|---|---|---|---|---|---|
| | 1 | 2 | 3 | 4 | 5 | 1 | 2 | 3 | 4 | 5 |
| Modified polyethylene | | | | | | | | | | |
| C1 | 6 | 5 | 7 | — | — | — | — | — | 1 | 10 |
| C2 | — | — | — | 5 | — | — | — | — | — | — |
| C3 | — | — | — | — | 5 | — | — | — | — | — |
| Migration type antistatic agent | — | — | — | — | — | — | 2 | — | — | — |
| Water soluble acrylic resin | — | — | — | — | — | — | — | coating | — | — |
| Thickness of heat sealable resin layer (μm) | 5 | 5 | 5 | 5 | 5 | 5 | 5 | 5 | 5 | 5 |
| Evaluation | | | | | | | | | | |
| Suitability for paper feeding and discharge for printing | good | good | good | good | good | slightly poor | good | good | slightly poor | good |
| Surface resistivity (Ω/□) | | | | | | | | | | |
| Just after label production | $2 \times 10^{12}$ | $8 \times 10^{11}$ | $3 \times 10^{12}$ | $1 \times 10^{12}$ | $9 \times 10^{11}$ | $1 \times 10^{15}$ | $2 \times 10^{11}$ | $9 \times 10^{9}$ | $1 \times 10^{15}$ | $5 \times 10^{11}$ |
| 6 months after production | $1 \times 10^{12}$ | $9 \times 10^{11}$ | $2 \times 10^{12}$ | $8 \times 10^{11}$ | $1 \times 10^{12}$ | $1 \times 10^{15}$ | $3 \times 10^{14}$ | $2 \times 10^{11}$ | $1 \times 10^{15}$ | $7 \times 10^{11}$ |
| Suitability for insertion of label | ○ | ○ | ○ | ○ | ○ | x | ○ | ○ | x | ○ |
| Blistering | not occurred | not occurred | not occurred | not occurred | not occurred | not occurred | occurred | occurred | not occurred | occurred |
| Adhesion strength to container (g/15 mm) | 550 | 450 | 590 | 470 | 460 | 620 | 250 | 20 | 600 | 150 |

*Linear low density polyethylene UJ960 (trade name) manufactured by Japan Polychem Corp. (density, 0.935 g/$cm^2$, MFR, 5 g/10 min)
PEEA: polyetheresteramine
Surface resistivity: determined on the heat sealable resin layer side of label.
Tm: melting point Effects of the Invention The in-mold label of the present invention can be easily inserted into a mold and gives a labeled container in which the label applied has no blister and has been fusion-bonded to the container at a high strength.

The disclosure of Japan priority application Hei: 10-108452, filed Apr. 6, 1998, is hereby incorporated by reference.

What is claimed is:

1. An in-mold label comprising a thermoplastic resin film base layer (I) comprising a thermoplastic resin carrying printed matter on the front side of the base layer (I) and a heat sealable resin layer (II) formed on the back side of the base layer (I), said heat sealable resin layer (II) being made of a resin composition comprising component (a): a polyethylene resin 55–90 wt % component (b): a polyetheresteramide 5–40 wt % component (c): a modified low-molecular weight polyethylene 1–20 wt % and component (d): a polyamide resin 0–20 wt %.

2. The in-mold label as claimed in claim 1, wherein the component (b) is a polyetheresteramide containing aromatic rings which is derived from component (b1): a polyamide having a number-average molecular weight of from 200 to 5,000 and containing a carboxyl group at each end and component (b2): an alkylene oxide adduct of bisphenol having a number-average molecular weight of from 300 to 5,000.

3. The in-mold label as claimed in claim 1, wherein the component (c) is a modified low-molecular weight polyethylene selected from the following components (c1) and (c2):

component (c1): a modified low-molecular weight polyethylene containing at least one carboxylic acid group or anhydride group and having a number-average molecular weight of from 800 to 25,000 and an acid value of from 5 to 150, and component (c2): a modified low-molecular weight polyethylene having a number-average molecular weight of from 850 to 28,000 which is obtained by secondarily modifying part or all of said carboxylic acid group or anhydride group in component (c1) with an alkanolamine and/or a polyoxyalkylene compound containing at least one hydroxyl or amino group.

4. The in-mold label as claimed in claim 1, wherein the thermoplastic resin has a melting point higher by at least 15° C. than that of the component (a) contained in the heat sealable resin layer (II).

5. The in-mold label as claimed in claim 1, wherein the component (a) is a polyethylene resin having a degree of crystallinity of from 10 to 60%, a number-average molecular weight of from 10,000 to 40,000, and a melting point of from 80 to 130° C.

6. The in-mold label as claimed in claim 1, wherein the thermoplastic resin film base layer (I) is a microporous laminate resin film comprising a core layer (A) of a biaxially stretched film of a resin composition comprising from 2 to 30 wt % of fine inorganic particles, from 3 to 20 wt % of a high density polyethylene, and from 95 to 50 wt % of a propylene resin, a facing layer (B) laminated to one side of the core layer (A) and of a uniaxially stretched film of a resin composition comprising from 35 to 65 wt % of fine inorganic particles, from 0 to 10 wt % of a high density polyethylene, and from 55 to 35 wt % of a propylene resin, and a backing layer (C) laminated to the core layer (A) on the side opposite to the layer (B) and of a uniaxially stretched film of a resin composition comprising from 35 to 65 wt % of fine inorganic particles, from 0 to 10 wt % of a high density polyethylene, and from 55 to 35 wt % of a propylene resin, the base layer (I) having printed matter on the layer (B) side and having the heat sealable resin layer (II) on the layer (C) side.

7. The in-mold label of claim 1, wherein the component (b) has a reduced viscosity, measured in 0.5 wt % m-cresol solution at 25° C., of from 0.5 to 40 dL/g.

8. The in-mold label of claim 1, wherein the component (c) has a number-average molecular weight of from 800 to 30,000 and contains at least one group selected from the group consisting of hydroxyl, carboxyl, carboxylic anhydride, oxyalkylene, epoxy and amino groups.

9. The in-mold label of claim 1, wherein the thermoplastic resin is selected from the group consisting of a polypropylene, a high density polyethylene, a poly(vinyl chloride), a poly(ethylene terephthalate) and a polyamide.

10. The in-mold label of claim 1, wherein the thermoplastic resin has a number-average molecular weight of from 10,000 to 500,000 and a melting point of from 135 to 264° C.

11. The in-mold label of claim 1, wherein the base layer (I) is selected from the group consisting of i) a film of a thermoplastic resin; ii) a synthetic paper of a microporous stretched polypropylene film containing an inorganic filler; iii) a coated film of said resin film i) or said synthetic paper ii) coated with inorganic filler-containing latex; iv) a deposited aluminum film onto any of the above i), ii) and iii); and v) a laminate of two or more of the above i), ii), iii) and iv).

12. The in-mold label of claim 1, wherein the component (a) has a melting point of from 80 to 130° C. and is selected from the group consisting of high pressure polyethylenes having a density of from 0.900 to 0.935 g/cm$^3$, linear polyethylenes having a density of from 0.880 to 0.940 g/cm$^3$, ethylene/vinyl acetate copolymers, ethylene/acrylic acid copolymers, ethylene/alkyl acrylate copolymers, ethylene/alkyl methacrylate copolymers and ethylene/metal methacrylate copolymers.

13. The in-mold label of claim 1, wherein the base layer (I) has a thickness of from 20 to 200 $\mu$m and the heat sealable resin layer (II) has a thickness of from 1 to 10 $\mu$m.

14. The in-mold label of claim 6, wherein the microporous laminate resin film has a density of from 0.65 to 1.02 g/cm$^3$.

15. The in-mold label of claim 6, wherein the layers (A), (B) and (C) have a thickness of from 12 to 80 $\mu$m, from 2 to 40 $\mu$m and from 2 to 40 $\mu$m, respectively.

16. The in-mold label of claim 6, wherein further comprises an interlayer (D) between the layers (A) and (B), the layer (D) being a uniaxially stretched film having a thickness of 0 to 40 $\mu$m of a resin composition containing from 35 to 65 % by weight of fine inorganic particles, from 55 to 35 % by weight of propylene resin and from 0 to 10 % by weight of high density polyethylene, the content of fine inorganic particles in the layer (D) being different from that in the layer (B).

17. The in-mold label as claimed in claim 2, wherein the component (c) is a modified low-molecular weight polyethylene selected from the following components (c1) and (c2):

component (c1): a modified low-molecular weight polyethylene containing at least one carboxylic acid group or anhydride group and having a number-average molecular weight of from 800 to 25,000 and an acid value of from 5 to 150, and component (c2): a modified low-molecular weight polyethylene having a number-average molecular weight of from 850 to 28,000 which is obtained by secondarily modifying part or all of said carboxylic acid group or anhydride group in component (c1) with an alkanolamine and/or a polyoxyalkylene compound containing at least one hydroxyl or amino group.

18. The in-mold label as claimed in claim 2, wherein the thermoplastic resin has a melting point higher by at least 15° C. than that of the component (a) contained in the heat sealable resin layer (II).

19. The in-mold label as claimed in claim 2, wherein the component (a) is a polyethylene resin having a degree of crystallinity of from 10 to 60%, a number-average molecular weight of from 10,000 to 40,000, and a melting point of from 80 to 130° C.

20. The in-mold label as claimed in claim 2, wherein the thermoplastic resin film base layer (I) is a microporous laminate resin film comprising a base layer (A) consisting of a biaxially stretched film of a resin composition comprising from 2 to 30 wt % fine inorganic particles, from 3 to 20 wt % high density polyethylene, and from 95 to 50 wt % propylene resin, a layer (B) laminated to one side of the base layer (A) and consisting of a uniaxially stretched film of a resin composition comprising from 35 to 65 wt % fine inorganic particles, from 0 to 10 wt % high density polyethylene, and from 55 to 35 wt % propylene resin, and a layer (C) laminated to the base layer (A) on the side opposite to the layer (B) and consisting of a uniaxially stretched film of a resin composition comprising from 35 to 65 wt % fine inorganic particles, from 0 to 10 wt % high density polyethylene, and from 55 to 35 wt % propylene resin, the base layer (I) having printed matter on the layer (B) side and having the heat sealable resin layer (II) on the layer (C) side.

21. The in-mold label as claimed in claim 3, wherein the thermoplastic resin has a melting point higher by at least 15 ° C. than that of the polyethylene resin as component(s) contained in the heat sealable resin layer (II).

22. The in-mold label as claimed in claim 3, wherein the component (a) is a polyethylene resin having a degree of crystallinity of from 10 to 60%, a number-average molecular weight of from 10,000 to 40,000, and a melting point of from 80 to 130° C.

23. The in-mold label as claimed in claim 3, wherein the thermoplastic resin film base layer (I) is a microporous laminate resin film comprising a base layer (A) consisting of a biaxially stretched film of a resin composition comprising from 2 to 30 wt % fine inorganic particles, from 3 to 20 wt % high density polyethylene, and from 95 to 50 wt % propylene resin, a layer (B) laminated to one side of the base layer (A) and consisting of a uniaxially stretched film of a resin composition comprising from 35 to 65 wt % fine inorganic particles, from 0 to 10 wt % high density polyethylene, and from 55 to 35 wt % propylene resin, and a layer (C) laminated to the base layer (A) on the side opposite to the layer (B) and consisting of a uniaxially stretched film of a resin composition comprising from 35 to 65 wt % fine inorganic particles, from 0 to 10 wt % high density polyethylene, and from 55 to 35 wt % propylene resin, the base layer (I) having printed matter on the layer (B) side and having the heat sealable resin layer (II) on the layer (C) side.

24. The in-mold label as claimed in claim 4, wherein the component (a) is a polyethylene resin having a degree of crystallinity of from 10 to 60%, a number-average molecular weight of from 10,000 to 40,000, and a melting point of from 80 to 130° C.

25. The in-mold label as claimed in claim 4, wherein the thermoplastic resin film base layer (I) is a microporous laminate resin film comprising a base layer (A) consisting of a biaxially stretched film of a resin composition comprising from 2 to 30 wt % fine inorganic particles, from 3 to 20 wt % high density polyethylene, and from 95 to 50 wt % propylene resin, a layer (B) laminated to one side of the base layer (A) and consisting of a uniaxially stretched film of a resin composition comprising from 35 to 65 wt % fine inorganic particles, from 0 to 10 wt % high density polyethylene, and from 55 to 35 wt % propylene resin, and a layer (C) laminated to the base layer (A) on the side opposite to the layer (B) and consisting of a uniaxially stretched film of a resin composition comprising from 35 to 65 wt % fine inorganic particles, from 0 to 10 wt % high density polyethylene, and from 55 to 35 wt % propylene resin, the base layer (I) having printed matter on the layer (B) side and having the heat sealable resin layer (II) on the layer (C) side.

26. The in-mold label as claimed in claim 5, wherein the thermoplastic resin film base layer (I) is a microporous laminate resin film comprising a base layer (A) consisting of a biaxially stretched film of a resin composition comprising from 2 to 30 wt % fine inorganic particles, from 3 to 20 wt % high density polyethylene, and from 95 to 50 wt % propylene resin, a layer (B) laminated to one side of the base layer (A) and consisting of a uniaxially stretched film of a resin composition comprising from 35 to 65 wt % fine inorganic particles, from 0 to 10 wt % high density polyethylene, and from 55 to 35 wt % propylene resin, and a layer (C) laminated to the base layer (A) on the side opposite to the layer (B) and consisting of a uniaxially stretched film of a resin composition comprising from 35 to 65 wt % fine inorganic particles, from 0 to 10 wt % high density polyethylene, and from 55 to 35 wt % propylene resin, the base layer (I) having printed matter on the layer (B) side and having the heat sealable resin layer (II) on the layer (C) side.

27. The in-mold label as claimed in claim 1, wherein an outer surface of said heat sealable resin layer (II) is embossed.

28. A container comprising a hollow container having adhered to a surface thereof the in-mold label as claimed in claim 1.

* * * * *

UNITED STATES PATENT AND TRADEMARK OFFICE

CERTIFICATE OF CORRECTION

PATENT NO. : 6,551,671 B1

DATED : April 22, 2003

INVENTOR(S) : Takatoshi Nishizawa et al.

It is certified that error appears in the above-identified patent and that said Letters Patent is hereby corrected as shown below:

Column 18,

Line 25, "component (s)" should read -- component (a) --

Signed and Sealed this

Thirteenth Day of January, 2004

JON W. DUDAS

*Acting Director of the United States Patent and Trademark Office*